United States Patent
Bayne

(10) Patent No.: US 8,160,219 B2
(45) Date of Patent: *Apr. 17, 2012

(54) CONTROLLED THREE WAY CALLING

(76) Inventor: Anthony Jeremiah Bayne, Lomita, CA (US)

(*) Notice: Subject to any disclaimer, the term of this patent is extended or adjusted under 35 U.S.C. 154(b) by 263 days.

This patent is subject to a terminal disclaimer.

(21) Appl. No.: 12/609,005

(22) Filed: Oct. 29, 2009

(65) Prior Publication Data
US 2010/0111274 A1    May 6, 2010

Related U.S. Application Data

(60) Provisional application No. 61/110,976, filed on Nov. 3, 2008.

(51) Int. Cl.
*H04M 15/00* (2006.01)
(52) U.S. Cl. .......... 379/114.21; 379/114.05; 379/114.23
(58) Field of Classification Search ............... 379/93.21, 379/158, 202.01–206.01; 455/416
See application file for complete search history.

(56) References Cited

U.S. PATENT DOCUMENTS

| 6,389,293 | B1* | 5/2002 | Clore et al. | 455/462 |
| 6,560,323 | B2 | 5/2003 | Gainsboro | |
| 6,788,771 | B2 | 9/2004 | Manto | |
| 6,795,540 | B1 | 9/2004 | Mow | |
| 6,836,540 | B2 | 12/2004 | Falcone et al. | |
| 7,136,471 | B2 | 11/2006 | Johnson | |
| 7,822,186 | B1* | 10/2010 | Boni | 379/210.01 |
| 2005/0010658 | A1* | 1/2005 | Nettamo | 709/223 |
| 2006/0171517 | A1* | 8/2006 | Link et al. | 379/114.21 |
| 2006/0286962 | A1 | 12/2006 | Davis | |
| 2007/0116214 | A1 | 5/2007 | Kitchen et al. | |
| 2008/0165944 | A1* | 7/2008 | Rosenthal et al. | 379/202.01 |

* cited by examiner

*Primary Examiner* — Hemant Patel
*Assistant Examiner* — Solomon Bezuayehu

(57) ABSTRACT

An inmate calls a call processing system and provides two phone numbers to it. The first phone number is for a 2nd Party who will accept the inmate's collect call and who will agree to pay any additional charge for adding a third party to the collect call. The second phone number is for a 3rd Party the inmate would like added to the collect call. The call processing system places the inmate on hold while the system dials the 2nd Party. When the 2nd Party accepts the inmate's collect call and agrees to pay for an additional fee for establishing a three-way call during the collect call, the inmate is taken off hold and is connected to the 2nd Party.

19 Claims, 2 Drawing Sheets

US 8,160,219 B2

CONTROLLED THREE WAY CALLING

RELATED APPLICATIONS

The present application claims the benefit of U.S. Provisional Patent Application Ser. No. 61/110,976 filed Nov. 3, 2008, which is hereby incorporated by reference as if set forth fully herein.

TECHNICAL FIELD

The present invention relates to controlling the dialing of phone numbers in a telecommunication system for a three-way call. More particularly, the present invention relates to systems and methods for providing controlled communications between an inmate and others using specialized three-way calling.

DESCRIPTION OF THE RELATED TECHNOLOGY

Inmates, and other persons in custody, often make collect phone calls (i.e. the called party pays for the phone call). Sometimes, during a collect call, the inmate may ask the person who accepted the collect call (hereinafter "$2^{nd}$ Party") to add an additional party (hereinafter "$3^{rd}$ Party") to the collect call in progress, making the collect call a "three-way" call. Three-way calling may be accomplished by the $2^{nd}$ Party quickly depressing the $2^{nd}$ Party's phone's receiver (hook flash) which places the inmate on hold, and gives the $2^{nd}$ Party a dial tone, so the $2^{nd}$ Party may dial a $3^{rd}$ Party's phone number. When the phone is answered, the $2^{nd}$ Party depresses the receiver again to connect all three parties.

Telecommunication service providers that provide call services to custodial institutions (e.g. mental institutions, juvenile detention, etc.) and/or penal institutions (e.g. prison, jails) (collectively "penal institution") often use specialized equipment ("control boxes") that automatically detects and terminates any inmate collect call when the $2^{nd}$ Party attempts to add, or does add, a $3^{rd}$ party to the ongoing collect call. For example, the control box may disconnect the collect call when it detects a hook flash for a three-way call.

In a penal institution, inmate three-way calling may be prohibited for various reasons. One reason is security; the institution's inmate call service provider (hereinafter "service provider") has no way to determine who the $2^{nd}$ Party is adding to the inmate's collect call after the hook flash (i.e. the service provider does not know what $3^{rd}$ Party phone number the $2^{nd}$ Party is dialing). For example, the $2^{nd}$ Party may add a $3^{rd}$ Party (e.g. named victim) to the collect call that the inmate is not to communicate with. This is a problem overcome by the present invention.

Another reason is financial; a $2^{nd}$ Party who adds a $3^{rd}$ Party to the inmate's collect call without the help of the service provider does not pay a fee to the service provider for adding the $3^{rd}$ Party. When this happens, both the service provider and the penal institution may lose revenue from collect calls that would have taken place between the inmate and the $3^{rd}$ Party that normally would have been connected by the service provider.

Further, if an inmate may contact (e.g. call) a $3^{rd}$ Party, and a $2^{nd}$ Party is willing to pay an additional fee for adding the $3^{rd}$ Party to a collect call between the inmate and the $2^{nd}$ Party, a service provider could earn additional revenue by connecting the $3^{rd}$ Party to the inmate's collect call with the $2^{nd}$ Party (making it a three-way call) when the $3^{rd}$ Party is unable to accept a collect call. Therefore, remains a need for an improved communication system that allows inmates to participate in a three-way call, where the service provider controls what $3^{rd}$ Party is added to the inmate's collect call.

SUMMARY OF CERTAIN INVENTIVE ASPECTS

The system and method of the invention each have several aspects, no single one of which is solely responsible for its desirable attributes. Without limiting the scope of this invention as expressed by the claims that follow, its more prominent features will now be discussed briefly. After considering this discussion, and particularly after reading the section entitled "Detailed Description of Certain Embodiments" one will understand how the features of this invention provide advantages that include providing improved efficiency of telephony in a penal environment, and controlling a three-way call that includes an inmate's collect call.

One embodiment is a method for establishing a three-way call, comprising receiving two phone numbers by a call processing system that are submitted by an inmate, dialing the first phone number received by the call processing system, connecting the inmate to a second party who answers the phone for the first number dialed, when the second party agrees to pay for a collect call and an additional charge for adding a third party to the collect call, dialing the second phone number received by the call processing system, and establishing a three-way call by adding a third party to the collect call when a phone is answered for the second phone number dialed.

Another embodiment is a system for controlling a three-way call, where the phone numbers used to establish the three-way call are submitted by an inmate, comprising means to receive two phone numbers from an inmate, means to dial the first phone number of a second party, means to receive agreement from the second party to terms for establishing a collect call between the inmate and second party, as well as an agreement to terms for adding a third party to the collect call when the phone is answered, where the means to dial the first phone number excludes the inmate dialing the first phone number to the second party. Also the system comprises a means to dial the third party, where the means to dial the third party excludes the second party dialing the third party, and a means to add the third party to the collect call between the inmate and second party.

Another embodiment is a method for a controlled three-way call, comprising a three-way call (comprised of the parties to the collect call and a third party that is added to the collect call), where the phone numbers dialed to establish the collect call and to add the third party to the collect call are both dialed by a call processing system.

When the Applicant states that an inmate submits a phone number to the call processing system, the Applicant uses the word "submit" in the sense that the inmate "provides" a phone number to the call processing system. When the inmate is submitting a phone number to the call processing system, the inmate is not "dialing" a phone number, but instead is providing the phone number to the call processing system that may dial the phone number(s) submitted.

DETAILED DESCRIPTION OF CERTAIN EMBODIMENTS

The present invention provides controlled three-way calling for inmates in a penal institution, where a service provider's call processing system may be configured to receive, screen, and dial phone numbers submitted by an inmate to establish a three-way call.

While a three-way call that includes a collect call from an inmate will be discussed, the invention may be used to establish a three-way call where the inmate pays for the call between the inmate and a $2^{nd}$ Party, as well as for adding a $3^{nd}$ Party to the collect call.

By limiting inmate three-way calling to phone numbers that are dialed by the service provider's call processing system (but may be submitted by the inmate or $2^{nd}$ Party), the service provider can control who is being added to a collect call, and charge an appropriate fee for adding a $3^{rd}$ Party to a collect call.

Further, the present invention may be used to establish a new revenue stream for a participating service provider and/or penal institution when the service provider limits adding only a $3^{rd}$ Party to a collect call who is unable to a accept a collect call. In this way the service provider will earn income from calls that may have not otherwise been made, as the $3^{rd}$ Party whose phone is blocked from accepting collect calls may not have been able to conveniently accept an inmate's collect call any other way.

For example, prior to dialing any number, the system may determine whether a phone number submitted by an inmate is blocked from accepting a collect call. This may be done by querying a Line Identification Database (LIDB) maintained by the service provider, or other entity, for performing billing validation. LIDBs typically contain all billable directory number accounts maintained by a service provider. A phone number submitted for a $2^{nd}$ Party whose phone number is blocked from accepting a collect call may be rejected by the system. A phone number submitted for a proposed 3rd Party, whose phone number is able to receive a collect call, may be rejected by the system.

Rejecting a phone number for a $3^{rd}$ Party, that is able to accept the inmate's collect call, reduces the risk that the $2^{nd}$ Party will incur debt (in agreeing to pay for a three-way call) that may become uncollectable later. When it is determined that the $3^{rd}$ Party can accept a collect call, the inmate may be advised that the $3^{rd}$ Party's phone number is ineligible for a three-way call, and prompt the inmate to submit a substitute $3^{rd}$ Party phone number. On a case-by-case basis, a system administrator may grant an exception to the above. For example, when the $3^{nd}$ Party is a dependent of the $2^{nd}$ Party, or the $2^{nd}$ Party has funds in a prepaid account to debit in real time.

Figure 1:
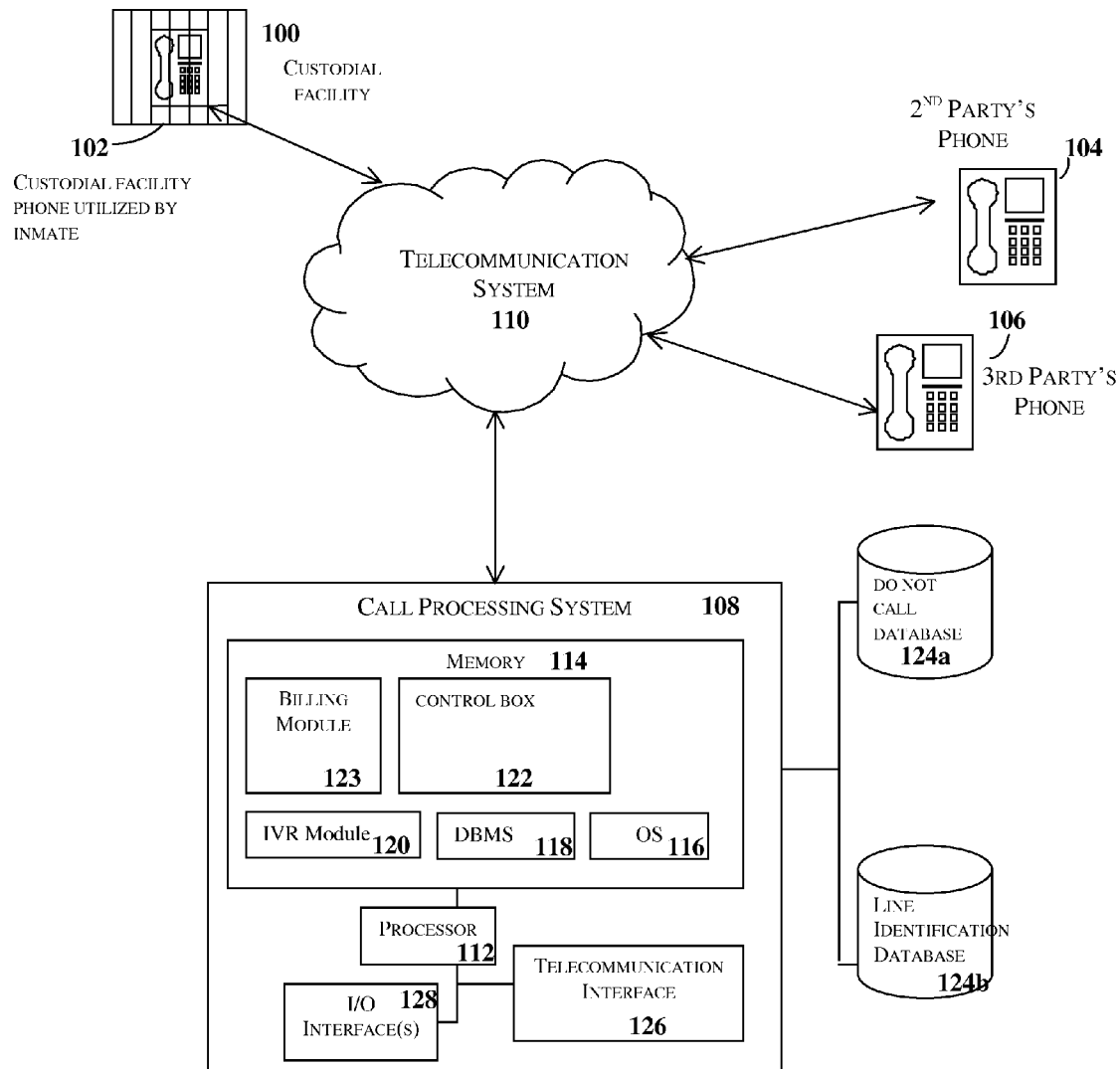
FIG. 1 is a block diagram illustrating an exemplary system in accordance with certain embodiments of the present invention.

Exemplary embodiments of the present invention will hereinafter be described with reference to the figures, in which like numerals indicate like elements throughout the several drawings. FIG. 1 is a block diagram illustrating an exemplary operating environment for implementation of certain embodiments of the present invention. The exemplary operating environment includes a custodial facility 100 having at least one custodial facility phone 102 to be utilised by an inmate, at least two telephones outside the custodial facility. One such phone 104 belonging to a $2^{nd}$ Party who will pay for the inmate's collect call and any three-way call, and whose phone number is submitted first by the inmate to a call processing system 108. The other outside phone 106 belonging to $3^{rd}$ Party, whose phone number is submitted second by the inmate to the call processing system 108. A telecommunication system 110 connects the custodial facility phone 102, the outside phones 104 & 106 and the call processing system 108.

The telecommunication system 110 may be any public and/or private communication network. In certain embodiments, the telecommunication system 110 is the Public Switched Telephone Network (PSTN). The telecommunication system 110 may include wired and/or wireless segments and may carry digital and/or analog signals. In alternate embodiments, the telecommunication system 110 may take other forms, such as a voice over IP network or other type of data network. The various components and functionality of typical telecommunication systems 110 are well known in the art and are therefore not reiterated herein.

The custodial facility phone 102 and the outside phones 104 & 106 may be any traditional telephones or other communication devices that are configured to interact with a telecommunication system 110. For example the custodial facility phone 102 and the outside phones 104 & 106 may be Touch-Tone telephones, rotary telephones, cellular or mobile phones, and the like. In other embodiments, the custodial facility phone 102 and the outside phones 104 & 106 could be replaced or supplemented by other communication devices, such as personal computers, laptop computers, hand-held computers, personal digital assistants ("PDA"), pagers, etc., as may be appropriate.

The call processing system 108 is contemplated as being a processor-driven device or collection of devices that is configured for receiving and processing telephone calls. The call processing system 108 may further be configured for accessing and reading associated computer-readable media having stored thereon data and/or computer-executable instructions for implementing the various methods of the present invention. In particular, a processor 112 for processing data and executing computer-executable instructions may drive the call processing system 108. The call processing system 108 also includes a memory 114, which may take the form of any computer-readable medium. The memory 114 may be logically and/or physically divided into multiple units.

The memory 114 stores data and program modules, such as, for example, an operating system ("OS") 116, a database management system ("DBMS") 118, an Interactive Voice Response ("IVR") module 120, and a control box (e.g. hook flash detection module) 122 and a billing module 123. These and/or other program may be executed by the call processing system 108 to perform the various methods of the present invention. By way of example, the IVR module 120 may provide functionality for responding to voice or other responses, such as Touch Tones, provided by a caller to the call processing system 108. The billing module 123 may provide functionality for generating bills for the $2^{nd}$ Party's phone 104, which may be charged an additional fee for establishing a three-way call during a collect call that includes the custodial facility phone 102 utilized by the inmate, the $2^{nd}$ Party's phone 104 and $3^{rd}$ Party's phone 106.

IVR functionality, control box functionality and billing functionality are well known in the art and are therefore not explained in detail herein. Those skilled in the art will appreciate that such functionality may be combined into fewer program modules or distributed among a greater number of modules than are illustrated in FIG. 1. In addition, such functionality may be distributed across multiple processor-driven devices, such as dedicated network servers, that collectively from the call processing system 108.

The call processing system 108 may include or be in communication with one or more databases. By way of illustration only, the call processing system 108 may be in communication with a "Do Not Call" database 124a for storing phone numbers that inmates are not allowed to call, and an LIDB 124b to store billable directory number account information and inmate PINs. In certain embodiments, the Do Not Call Database 124a may be combined with the LIDB 124b.

These and/or other databases may of course also store any other data used or generated by the call processing system 108. Those skilled in the art will appreciate that the illustrated databases 124a-b may be physically and/or logically separate from one another. For security, the call processing system 108 may have a dedicated connection to the databases 124a-b, as shown. However, the call processing system 108 may also communicate with one or more of the databases 124a-b via the telecommunication system 110 or other network(s).

Telephone calls may be received at the call processing system 108 through a telecommunication interface 126. The telecommunication interface 126 may take the form of a telephony line card or other suitable hardware and/or software for connecting the call processing system 108 to the telecommunication system 110 and providing the logical connection between the call processing system 108, custodial facility phone 102 and outside phones 104 & 106. The telecommunication interface 126 thus allows the calling and called party (ies) to interact with the call processing system 108 by providing voice commands, or Touch-Tone commands, that can be interpreted by the IVR module 120 and/or other program modules. The call processing system 108 may be configured with additional and/or other communication interfaces for providing logical connections to other types of communication devices and networks.

The call processing system 108 may also include input/output ("I/O") interface(s) 128 for providing logical connections to various I/O devices, such as a keyboard, a mouse, a microphone, a printer, a scanner, speakers, a display, etc. A system administrator may utilize these and other I/O devices to interact with the call processing system 108. For example, a system administrator may interact with the call processing system 108 to populate, edit, store and delete phone numbers from the Do Not Call Database 124a, as well as store, delete and associate PINs of the LIDB 124b with the phone numbers in the Do Not Call Database 124a, alter the parameters for the IVR module 120, the control box 122 and other program modules, etc. Those skilled in the art will appreciate that the call processing system 108 may include alternate and/or additional components, hardware or software. Thus configured or similarly configured, the call processing system 108 may provide controlled three-way calling for a collect call that originates from a custodial facility 100.

The call processing system 108 may be programmed to receive a call from an inmate using a custodial facility phone 102 who may be prompted by the IVR module 120 to identify himself or herself (e.g. say his name and/or enter his PIN) and to input two phone numbers to be dialed by the call processing system 108. The first phone number for a $2^{nd}$ Party's phone 104 and, the second phone number for a $3^{rd}$ Party's phone 106, when the inmate is requesting that a three-way call be established during the collect call.

For example the inmate may be queried "If you are requesting a collect call only, press or say "1"", "If you are requesting a collect call, and would like another person added during the collect call, press or say "2"". If the inmate says "2", he may further be prompted to "First enter the phone number for the party (i.e. $2^{nd}$ Party's phone 104) you want to accept your collect call, as well as pay for adding a third person to your collect call. Enter the phone number with area code now, and press the pound sign when you are finished", and after the inmate enters a phone number and presses the "#" sign, the inmate may be prompted to "Now enter the phone number with area code of the person you would like added as a $3^{rd}$ party to the collect call, and press the pound sign when you are finished."

In an alternate embodiment, the inmate may be allowed to submit a first phone number for a $2^{nd}$ Party phone 104 and submit a dummy phone number (e.g. "000-000-0000") for the $3^{rd}$ Party phone 106. The dummy phone number is a signal to the call processing system 108 that the $2^{nd}$ Party may submit a phone number for a $3^{rd}$ Party phone 106 during the collect call. This feature may be useful when the inmate would like the $2^{nd}$ Party to add a $3^{rd}$ Party to the collect call whose phone number the inmate cannot remember, but is known by the $2^{nd}$ Party. In this embodiment the $2^{nd}$ Party may be allowed to signal the call processing system 108 during the collect call to submit a phone number for a $3^{rd}$ Party phone 106. The call processing system 108 may place the inmate and $2^{nd}$ Party on hold while the phone number submitted by the $2^{nd}$ Party is screened against the Do Not Call database 124a, etc., before it is dialed by the call processing system 108.

The call processing system 108 may, in certain embodiments, place the custodial facility phone 102 on hold, and query the Do Not Call database 124a and/or LIDB 124b to verify that the submitted phone numbers are allowed to be called by the inmate, before the call processing system 108 dials the $2^{nd}$ Party's phone 104.

In an alternate embodiment, the call processing system 108 may instruct the inmate to hang up the custodial facility phone 102 after the call processing system 108 receives two phone number's from the inmate, so that the call processing system 108 may perform various functions (e.g. dial and receiving agreement from the $2^{nd}$ Party to accept the collect call and three-way call, etc.). In this embodiment, the call processing system 108 calls back the inmate at the custodial facility phone 102 to establish the collect call and instruct the person answering the call back to the custodial facility phone 102 to provide a personal identifier (e.g. PIN, DOB, inmate's mother's maiden name, etc.) to verify that it is the same inmate who submitted the phone numbers to the call processing system 108 initially.

When a phone number submitted by an inmate for a $2^{nd}$ Party phone 104 and/or $3^{rd}$ Party's phone 106 is not authorized for the inmate, a notification may be provided to the inmate, and the call may be terminated. For example, a warning may be played to the custodial facility phone 102 that the inmate may have his calling privileges suspended when the inmate submits a phone number that is in the do not call database 124a for the PIN entered, and the call may be disconnected.

In an alternate embodiment, instead of disconnecting the inmate, the inmate may be prompted to submit a substitute phone number for any phone number rejected by the call processing system 108, and be allowed a fixed number of attempts to submit a substitute phone number before being disconnected.

If the inmate's submitted phone numbers are accepted for processing, the call processing system 108 may prompt the inmate to indicate whether instructions for using the service should be provided in English, Spanish or another available language option. For example, the IVR module 120 may prompt the inmate to press a key corresponding to a language selection or to say the name of the desired language. Other terms and conditions for use of the services provided by the call processing system 108 may be audibly presented to the inmate, for example by the IVR module 120.

If the call is allowed, the call processing system 108 will dial the number input for the $2^{nd}$ Party's phone 104. If 2nd Party's phone 104 is answered, the call processing system 108 will advise 2nd Party that (in addition to the service provider's usual notices) that an additional fee will be charged for a three-way call that is established during the collect call, and instruct the $2^{nd}$ Party on how to make a three-way call during the collect call.

Additionally, the $2^{nd}$ Party may be given the opportunity to be audibly presented with the second phone number submitted by the inmate for a $3^{rd}$ Party, and/or have the $3^{rd}$ Party's name audibly identified to the $2^{nd}$ Party (e.g. the inmate after entering the second phone number may also be prompted to say the $3^{rd}$ Party's name, that is then played back to the $2^{nd}$ Party) before the $2^{nd}$ Party is asked to accept the presented terms.

If the 2nd Party accepts the terms, the call processing system 108 may connect the custodial phone 102 to the 2nd Party's phone 104. The 2nd Party bears all additional costs for communicating with the inmate, and for adding the $3^{rd}$ Party phone 106 to the collect call. Other methods for connecting the inmate utilizing a custodial facility phone 102 to the 2nd Party's phone 104 are known in the art and are contemplated herein. In the preferred embodiments, all payment processing and verification services involving the 2nd Party's phone 104 are handled by the service provider's telecommunication system 110, for example by a participating telephone company.

Those skilled in the art will appreciate that the operating environment shown in and described with respect to FIG. 1 is provided by way of example only. Numerous other operating environments, system architectures and device configurations are possible. For example, the call processing system 108 may in certain embodiments be implemented at or within the custodial facility 100. In other embodiments, various components of the PSTN may be adapted for performing the functionally described with respect to the present invention. Accordingly, the present invention should not be construed as being limited to any particular operating environment, system architecture or device configuration.

Figure 2:
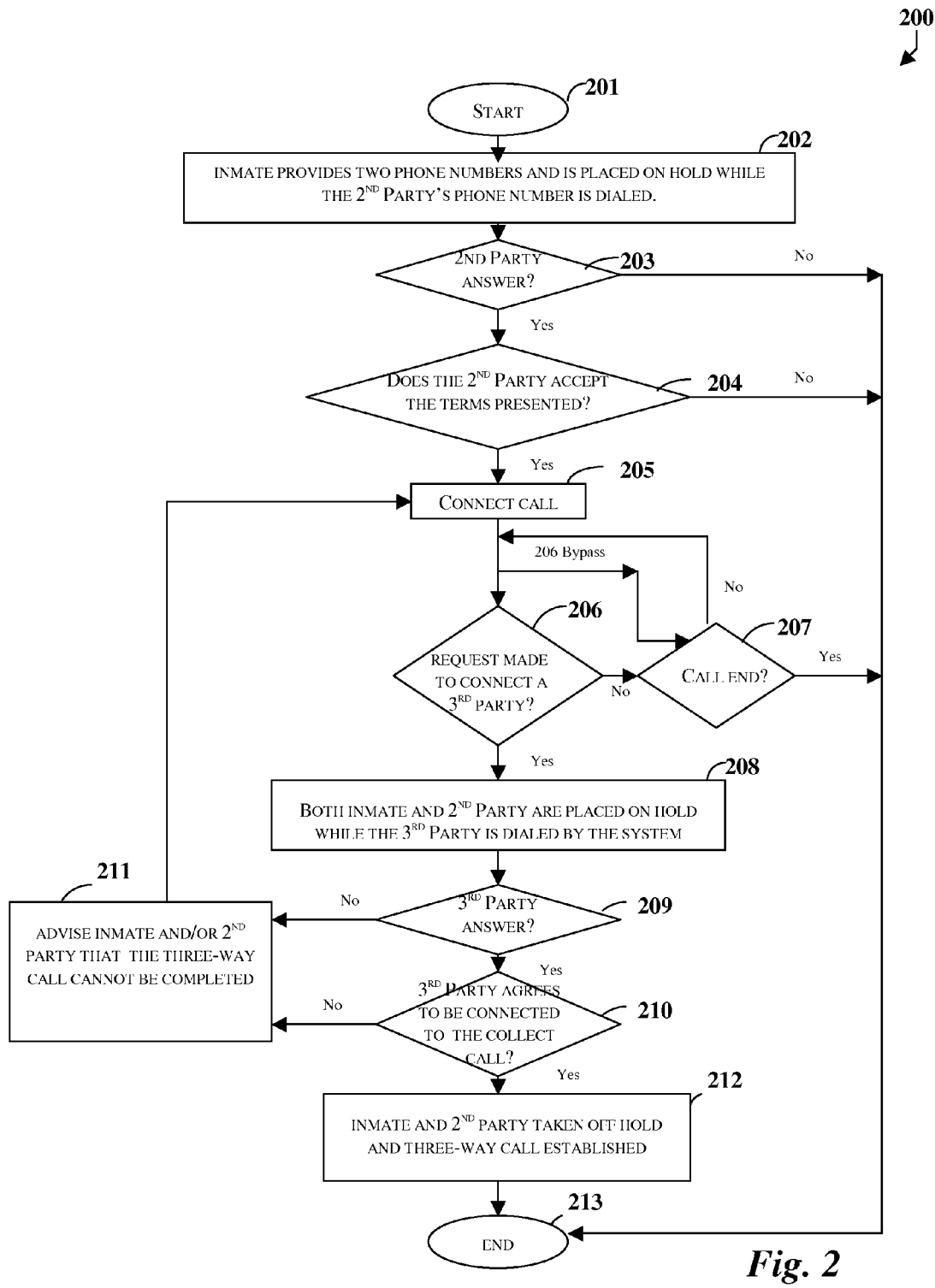
FIG. 2 is a flow diagram illustrating an exemplary method for processing a controlled three-way call, where the phone numbers are submitted by an inmate and dialed by a service provider, in accordance with certain embodiments of the present invention.

FIG. 2 is a flow diagram illustrating an exemplary method for processing a controlled three-way call, where the phone numbers are submitted by an inmate using a custodial facility phone 102 to a call processing system 108, that may then dial the phone numbers to a $2^{nd}$ Party phone 104 and a $3^{rd}$ Party phone 106, in accordance with certain embodiments of the invention. With reference to FIG. 2, the method begins at starting block 201 and progresses to step 202, where the inmate initiates a collect call set-up using the custodial facility phone 102. Further, the call processing system 108 may prompt the inmate using the custodial facility phone 102 to identify himself (e.g. say his name, enter his PIN, etc.), and input two phone numbers to be dialed by the call processing system 108; the first phone number is for the 2nd Party's phone 104, belonging to a person who may accept the inmate's collect call, as well as pay an additional fee for adding a $3^{rd}$ Party to the collect call, and a second phone number for a $3^{rd}$ Party's phone 106 that may be added to the collect call. The inmate using the custodial phone 102 is placed on hold, and the $2^{nd}$ Party's phone 104 is dialed.

The term "collect call" includes a promise to pay, such as payment via a traditional billed phone account, as well as payment by way of a debit card, debit account, prepaid account, prepaid calling card, electronic funds transfer, and credit card.

In an alternate embodiment, before dialing any number, the call processing system 108 may screen the numbers provided by the inmate against a "Do Not Call" database 124a, LIDB 124b, or similar database. An inmate may be assigned a personal identification number ("PIN") that may be, for example, the last 5 numbers of the inmate's booking number, Depart of Corrections Number, etc., and the call processing system 108 using this PIN may query the LIDB 124b to verify that the PIN is valid and not associated with any phone number in the Do Not Call Database 124a for the entered PIN. A list of phone numbers for persons whom the inmate is not to have contact with (directly or indirectly) may be linked to the PIN and stored in the Do Not Call database 124a. Thus, an inmate may be identified and the Do Not Call database 124a may be interrogated based on the PIN entered. If the PIN cannot be verified, or is associated with a phone number in the Do Not Call database 124a, the call processing system 108 may advise the inmate that his call cannot go through and disconnect the inmate's attempted call. Alternatively, the call processing system 108 may instruct the inmate to submit a substitute phone number. The call processing system 108 may allow an inmate a fixed number of attempts to submit a substitute phone number, or allow the inmate to continue to attempt allowable phone numbers until the inmate submits at least two phone numbers (for a $2^{nd}$ Party phone 104 and $3^{rd}$ Party phone 106) that are not found in the Do Not Call database 124a. Otherwise the inmate may be notified that his call cannot be completed and the method proceeds to step 213 where the exemplary method ends.

In an alternate embodiment, instead of, or in addition to a Do Not Call database 124a, a database with phone numbers that an inmate may exclusively dial (not shown) could be queried by the call processing system 108, to allow only those phone numbers be used in a collect, or three-way call.

In an additional alternate embodiment, the call processing system 108 may determine whether the second phone number for the $3^{rd}$ Party phone 106 is unable to accept a collect call, and allow that number to be dialed and added by the call processing system 108 to a collect call between the inmate and the $2^{nd}$ Party. In this embodiment, when it is determined that the second number submitted by the inmate for a $3^{rd}$ Party phone 106 is able to accept a collect call, the call processing system 108 may prompt the inmate to submit a substitute phone number for a $3^{rd}$ Party phone 106 that is unable to accept a collect call.

The method proceeds to step 203, where a determination is made whether the call to the $2^{nd}$ Party phone 104 is answered. If the call is not answered, the exemplary method proceeds to step 213 and ends. If the call is answered, the method proceeds to step 204, where the call processing system 108 may inform the 2nd Party of terms (in addition to any message usually given by the service provider for setting up an inmate collect call) for establishing a three-way call during the collect call, including that an additional charge will apply for adding a third party to the collect call.

Additionally the call processing system 108 may provide the 3rd Party's phone 106 number, any name associated with that phone number (e.g. one supplied by the inmate to the call processing system 108 after submitting the second phone number), as well as information on costs to the $2^{nd}$ Party, before the $2^{nd}$ Party accepts any inmate collect call that may become a three-way call.

After all the terms and conditions are audibly presented via the phone 104 utilised by 2nd Party, a determination is made at step 204 as to whether 2nd Party accepts or rejects the terms presented (e.g. press "1" or say "yes" to accept, press "2" or hang up to reject). If the 2nd Party does not accept the terms presented, the call is terminated and the exemplary method ends at step 213. If the presented terms are accepted at step 204, the method advances to step 205 where the collect call is connected. Those skilled in the art will appreciate that many techniques may be used for connecting the custodial facility phone 102 to the 2nd Party's phone 104 (e.g. call bridging).

Proceeding to step 206, the call processing system 108 determines whether a request to establish a three-way call is made during the collect call. The request can be detected, for example by the control box 122 of the call processing system 108. The functionality of control boxes is well known to those skilled in the art and so is not discussed further herein. The call will continue to be monitored step 206 for a three-way call request until the call ends at step 207. The method proceeds to step 213 where the exemplary method then ends.

In a preferred embodiment, the $2^{nd}$ Party Phone 104 is used to signal the call processing system 108 to add the $3^{rd}$ Party phone 106 to the collect call. In an alternate embodiment, either the inmate or $2^{nd}$ Party may signal the call processing system 108 to add the $3^{rd}$ Party phone 106 to the collect call. In both a preferred and alternate embodiment, neither the inmate nor the $2^{nd}$ Party dials another party directly, but instead the call processing system 108 dials each phone number to control what number is dialed.

In an alternate embodiment, prior to the call processing system 108 attempting to make a three-way call, the 2nd Party could again be advised that additional fees will be charged for establishing a three-way call during the collect call, and instructed to affirmatively accept the terms of the three-way call. If the 2nd Party does not accept the terms a second time, the method may reconnect the collect call at step 205. The call will continue to be monitored for another three-way call request at step 206 until it is determined that the call has ended at step 207, where the exemplary method then ends at step 213.

This may provide the $2^{nd}$ Party an opportunity to rescind his agreement to allow/pay for a three-way call, before the call processing system dials the second phone number. For example, a $2^{nd}$ Party may have agreed to pay for adding a $3^{rd}$ Party to a collect call during collect call set-up, but later becomes angry at the inmate during the collect call, and so now does not want to pay to have the $3^{rd}$ Party added. By prompting the $2^{nd}$ Party to agree or reject adding a third party to the collect call is established, the $2^{nd}$ Party may be given an opportunity to reject adding a $3^{rd}$ Party, by saying "NO" when prompted to do so. This will reduce the chance of any billing dispute between a $2^{nd}$ Party and service provider.

When the call processing system 108 determines at step 206 that a signal is made requesting to add the $3^{rd}$ Party's phone 106 to the collect call, the method proceeds to step 208 where both the inmate's phone 102 and $2^{nd}$ Party's phone 106 are placed on hold, and the $3^{rd}$ Party's phone 106 is dialed. The method proceeds to step 209 where the call processing center 108 determines if the call is answered. If the call is not answered, the inmate and/or $2^{nd}$ Party are informed at step 211 that the three-way call cannot be completed, and the method returns to step 205 where the collect call is re-established. The collect call will continue to be monitored for an additional three-way call request at step 206 until it is determined that the call has ended at step 207, where the exemplary method then ends at step 213.

When the second phone number for a $3^{rd}$ Party phone 106 is not answered, the inmate or $2^{nd}$ Party may be permitted to submit an additional phone number to the call processing system 108 for a $3^{rd}$ Party, by signaling the call processing system 108 at step 206 to submit another phone number during the collect call.

If the call is answered at step 209, a message may be played to $3^{rd}$ Party's phone 106, that a three-way call is being attempted that will include the inmate who is using a custodial facility phone 102.

The method then proceeds to step 210 where the call processing system 108 determines if the $3^{rd}$ Party agrees to be included in a three-way call that will include the inmate. This may be done by prompting the $3^{rd}$ Party to say "yes", press "#", etc. If the $3^{rd}$ Party does not give positive call acceptance, rejects being added to the collect call, or hangs up, the method proceeds to step 211 where the 2nd Party and/or inmate is informed that the three-way call cannot be completed.

In a preferred embodiment, when the $3^{rd}$ Party Phone 106 is answered, but the answering party does not provide positive call acceptance to be added to the collect call, the call processing system 108 will also notify the inmate and/or $2^{nd}$ Party that they will not be allowed to attempt to add any other person to the collect call. The method returns to step 205 where the collect call is reconnected. However, Step 206 will be bypassed by the call processing system 108, for the remainder of the collect call. The collect call will be monitored to determine if the call ends 207, where the exemplary method then ends at step 213.

In an alternate embodiment where the $3^{rd}$ Party phone 106 was answered, but no agreement was received to be added to the collect call, the reconnected collect call may continue to be monitored for a three-way call request at step 206, until it is determined that the call has ended at step 207, where the exemplary method then ends at step 213.

If the $3^{rd}$ Party accepts being added to a three-way call that will include the inmate and $2^{nd}$ Party, the method proceeds to step 212 where the custodial facility phone 102 utilized by the inmate and the $2^{nd}$ Party phone 104 are taken off hold, and a controlled three-way call is established. The three-way call continues until the 2nd Party (or other party) hangs up his phone 104, or any system administrator limiting call parameter is triggered (e.g. maximum call length reached, lights out, prepaid fund depleted, etc.) which terminates the call, and the exemplary method ends at step 213.

As may be seen from the foregoing, the present invention provides systems and methods for providing a three-way call that is controlled by the telecommunication service provider. It should be appreciated that the exemplary aspects and features of the present invention as described above are not intended to be interpreted as required or essential elements of the invention, unless explicitly stated as such. It should also be appreciated that the foregoing description of exemplary embodiments was provided by way of illustration only and that many other modifications, features, embodiments and operating environments are possible. Accordingly, the scope of the present invention should be limited only by the claims to follow.

I claim:

1. A method for establishing a three-way call, comprising:
   receiving two phone numbers by a call processing system that are submitted by an inmate,
   dialing the first phone number received by the call processing system,
   connecting the inmate to a second party who answers the phone for the first number dialed when the second party agrees to pay for a collect call and an additional charge for adding a third party to the collect call,
   dialing the second phone number received by the call processing system, and
   establishing a three-way call by adding a third party to the collect call when a phone is answered for the second phone number dialed.

2. The method of claim 1, further comprising the step of identifying the inmate to the third party, prior to connecting the third party to the collect call between the inmate and second party.

3. The method of claim 1, further comprising the step of receiving positive call acceptance from the third party, prior to connecting the third party to the collect call between the inmate and second party.

4. The method of claim 1, further comprising the step of the call processing system identifying the third party to the second party prior to dialing the third party.

5. The method of claim 4, further comprising the step of giving the second party an opportunity to signal the call processing system to not dial the second phone number, after the collect call is established between the inmate and second party, but before the second phone number is dialed by the call processing system.

6. The method of claim 1, further comprising the step of determining if the inmate is allowed to call the two submitted phone numbers, prior to the call processing system dialing any phone number.

7. The method of claim 6, further comprising the step of allowing the inmate to submit a substitute phone number for any phone number submitted that is determined to be a phone number that the inmate is not allowed to call.

8. The method of claim 1, further comprising the step of determining if the phone number submitted for the third party is able to accept a collect call, prior to dialing any phone number.

9. The method of claim 8, further comprising the step of allowing the inmate to submit a substitute phone number for a third party when it is determined that the phone number submitted for a third party can accept a collect call.

10. The method of claim 1, further comprising the step of instructing the inmate to hang up the phone after the call processing system receives the two phone numbers from the inmate.

11. The method of claim 10, further comprising the step of the call processing system dialing the first phone number while the inmate is disconnected from the call processing system.

12. The method of claim 11, further comprising the step of the call processing system calling back the inmate after the second party agrees to pay for a collect call and any additional charge for adding a third party to the collect call.

13. The method of claim 12, further comprising the step of the inmate providing a personal identifier to the call processing system before being connected to the second party via the call processing system call back.

14. The method of claim 1, wherein the first number submitted by the inmate is used by the call processing system to dial a second party who will pay for the inmate's collect call and any subsequent three-way call.

15. The method of claim 1, further comprising the step of dialing the second phone number when the call processing system is signaled to add a third party during the collect call.

16. The method of claim 1, wherein the second phone number submitted by the inmate is a signal to the call processing system that the person accepting the collect call will later submit a phone number for a third party to add to the collect call.

17. A system for controlling a three-way call, wherein the phone numbers used to establish the three-way call are submitted by an inmate, comprising:
- means to receive two phone numbers from an inmate, means to dial the first phone number of a second party, wherein the means excludes the inmate dialing the second party,
- means to receive agreement from the second party to terms for establishing a collect call between the inmate and the second party and for adding a third party to the collect call,
- means to dial the third party, wherein the means excludes the second party dialing the third party; and means to add the third party to the collect call.

18. The system of claim 17, further comprising means for receiving positive call acceptance from the third party, prior to connecting the third party to the collect call between the inmate and second party.

19. The system of claim 17, further comprising means for identifying the third party to the second party before receiving agreement from the second party to accept the terms.

* * * * *